Patented July 25, 1944

2,354,536

UNITED STATES PATENT OFFICE 2,354,536

LUBRICATING OIL COMPOSITION

Joseph F. Nelson, Elizabeth, N. J., assignor to Standard Oil Development Company, a corporation of Delaware No Drawing. Application January 2, 1941, Serial No. 372,893

9 Claims. (Cl. 252—48)

This invention relates to the preparation of improved lubricating compositions and is particularly concerned with certain new types of addition agents which, when incorporated in lubricating compositions, impart thereto highly desirable stability characteristics.

The maintenance of satisfactory automobile performance requires that a film of lubricating composition be present on moving engine surfaces, and that the composition be of good lubricating quality and satisfactory chemical stability. This film must be maintainable on exposed surfaces over periods of prolonged stoppage of the engine, even when the surfaces are vertical, and also sustainable or rapidly replaceable under severe operating conditions so as to prevent contact of unprotected metallic surfaces with each other. Desirable properties, therefore, of automobile engine lubricants include rapid formation of tenacious films, high penetrating and lubricating capacity, and homogeneity and stability in the presence of acidic and oxygen-containing gases at elevated temperatures.

The present invention is concerned with the preparation of highly stable lubricating compositions by the addition of small quantities of oil-soluble or oil-dispersible compounds of a new type to mineral lubricating oils. A group of compounds effective for the purposes of this invention and which fall within the above general grouping have the formula:

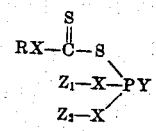

in which R is an organic radical, usually predominantly hydrocarbon in character, X is oxygen or sulfur, Y is oxygen or sulfur when phosphorus is pentavalent or it is omitted when phosphorus is trivalent, and $Z_1$ and $Z_2$ may be similar or dissimilar metals, onium bases, unsubstituted or substituted, organic radicals, especially hydrocarbon or heterocyclic radicals, or xanthogen groups. By the term xanthogen group is designated the monovalent grouping (RXCS)— in which R is an organic radical and X may be either oxygen or sulfur. The organic radical R in the xanthogen group is usually an unsubstituted or substituted alkyl radical or a benzyl group or homolog thereof. The total alkyl radicals in the compound should contain at least 6 carbon atoms to provide the desired oil solubility, and when many non-organic groups are present the number of such alkyl carbons should be increased correspondingly. In general there is no advantage in having a larger portion of the molecules in the form of alkyl chains than is required to obtain adequate oil solubility, though in certain instances the alkyl portion may be increased to obtain special properties such as the ability to depress the pour point of the oil or to increase the viscosity index.

Among the various suitable compounds employed in the invention, those having the phosphorus acid esterified with at least one alkylated aromatic alcohol or a phenol are suitable and, of these compounds, the oxyphosphites and thiophosphites are particularly desirable. In the case of mixed phosphites, that is, those which contain dissimilar groups attached to the phosphorus atom, the compounds which contain at least one alkylated aromatic radical attached through the oxygen or sulfur to the phosphorus atom or at least an alkylated aromatic radical in the xanthogen group or groups of the compounds are particularly suitable. The various alkyl and alkylated aromatic groups in these various compounds may contain halogen constituents, especially chlorine. When $Z_1$ and/or $Z_2$ are xanthogen groups the class of compounds may be represented by the formulae

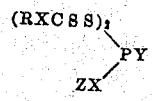

and $(RXCSS)_3PY$.

Instead of phosphorus in the above general class of compounds, arsenic, antimony or bismuth may be substituted and the compounds are advantageous lubricating oil addition agents within the scope of the invention. The compounds of the invention therefore include certain phospho-xanthogen compounds, that is, certain xanthogen-containing phosphates, phosphites, thiophosphates, thiophosphites, the corresponding arsenic, antimony and bismuth compounds; and substituted derivatives thereof. The xanthogen-containing compounds of this invention are those which have physical properties which insure adequate blending quality in the particular type of vehicle used in the lubricant. Such properties are largely determined by the molecular weight of the particular compound and include adequate oil solubility or oil dispersibility, suitable boiling point and satisfactory chemical stability. Another class of compounds falling within the scope of the invention are those in which the element represented by X in the xanthogen group in the general formula may be nitrogen. In this latter case, the R in the general formula must be replaced by two monovalent groups such as two hydrogen atoms or two monovalent hydrocarbon groupings, or it must be replaced by a divalent radical such as the pentamethylene group.

All the compounds of the invention may be classified in terms of the following more general formula:

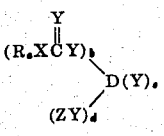

in which R may be a hydrogen atom or a hydrocarbon or substituted hydrocarbon radical; X may be oxygen, sulfur, or nitrogen; Y may be oxygen or sulfur; D may be phosphorus, or a metalloid like arsenic, antimony, or bismuth; Z may be an organic radical which may contain halogen, nitro, amino, hydroxy, keto, mercapto, carboxy, nitroso, amido, alkoxy, aroxy, or other substituent groups; may be a metal or a group containing a metal or an onium base like ammonium, sulfonium, phosphonium, or it may be a xanthogen group; $a$ may be either 1 or 2; $b$ may be 1, 2 or 3; $c$ is 0 or 1, $d$ is 0, 1 or 2; the choice of the value of these subscripts for these groups depends on the valency requirements of the various atoms and radicals in the compounds.

The following radicals are examples of the groups

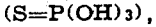

in the above formula:

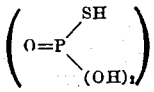
Carbopentoxy

Thiocarbopentoxy

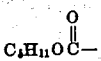
Carbodiamylamino

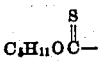
Thiocarbocyclohexylamino

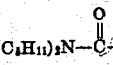
Thiocarboethoxyphenylamino

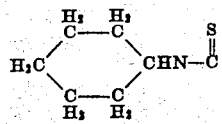
Thiocarbodiamylamino

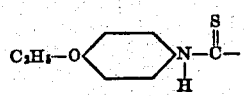
Carboamylmercapto

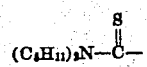
Thiocarboamylmercapto

These radicals can replace hydrogen in acids such as phosphorous acid, thiophosphorous acid, phosphoric acid, thionphosphoric acid, $$(S=P(OH)_3),$$

monothiolphosphoric acid

thiontrithiolphosphoric acid, $S=P(SH)_3$, etc.

Thus, classes of compounds within the scope of this invention include: carboalkoxy phosphites, thiolphosphates and thionphosphates; thiocarboalkoxy phosphites, thiolphosphates and thionphosphates; carbodialkylamino phosphites, thiolphosphates and thionphosphates, thiocarbodialkylamino phosphates, thiolphosphates and thionphosphates; carboalkylmercapto phosphites, thiolphosphates and thionphosphates; thiocarboalkylmercapto phosphites, thiolphosphates and thionphosphates; carboalkylamino phosphites, thiolphosphates and thionphosphates; and thiocarboalkylamino phosphites, thiolphosphates and thionphosphates; and corresponding derivatives bearing substituents in the alkyl groups and containing ordinary phosphite, thiophosphite, phosphate, or thiophosphate linkages; or compounds of the latter type containing no hydrocarbon groups in the "thiocarboxy" portions of their molecules. In addition to these phosphorus compounds, the corresponding arsenic, antimony and bismuth are also included within the scope of the invention.

Examples of individual compounds within the scope of this invention are diamylphenylthiocarboethoxy monothiophosphite, $(C_5H_{11}C_6H_4O)_2(C_2H_5OCSS)P$; trithiocarboethoxy trithiol phosphate, $(C_2H_5OCSS)_3PO$; trithiocarboethoxy trithiophosphite, $(C_2H_5OCSS)_3P$; trithiocarboethylmercapto trithiophosphite $(C_2H_5SCSS)_3P$; trithiocarboethoxy trithioarsenite, $$(C_2H_5OCSS)_3As;$$

lauryl dicarbomethylmercapto dithiophosphite,

phosphoryl octyl xanthate,

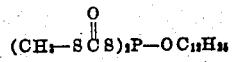

di-isobutoxy thiophosphoryl dilauryl monothiolcarbamate,

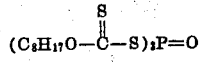

and the calcium salt of lauryl carbothiopentoxymonothiol phosphoric acid,

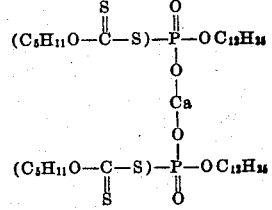

When compounds of this invention are incorporated in lubricating compositions in small amounts, that is in concentrations ranging between 0.05% and 2% and preferably between 0.1% and 1.0%, the resulting lubricating oil compositions are highly stable, especially as regards resistance to breakdown in an oxidizing atmosphere and to the development of corrosiveness toward alloy bearings of the cadmium-silver or copper-lead type.

The lubricating oil base stock of the compositions of the invention may be any lubricating oil, wax or grease, of natural or synthetic origin. If a mineral oil, it may be wholly a distillate or may contain residual products and may be any such material that has been refined by a refining process, such as acid treating, solvent extraction, hydrogenation, clay contacting, etc. The addition agents of this invention may be used as the sole addition agents or they may be used in conjunction with other materials capable of enhancing, as for example, the viscosity index, the pour point, extreme pressure, oiliness, rust preventing, spreading, detergent, dispersing and solvent characteristics of the oils.

The lubricating compositions thus prepared are investigated for quality by certain recognized standard tests of the petroleum industry. The tests by which the lubricants of the present invention were rated were the Oxygen absorption, Cone, Sligh and Lead tolerance tests. These tests are briefly described below:

OXYGEN ABSORPTION TEST

This test is used for the most part in judging the oxidation susceptibility of a lubricating oil at engine operation temperatures. In this test a known amount of oxygen is bubbled at atmospheric pressure through 10 cc. of the lubricating oil maintained at 200° C. The oxygen is continuously recycled. At the end of succeeding 15 minute periods the amount of oxygen absorbed by the oil is measured. The oxidation rate of the oil is given as the number of cubic centimeters of oxygen absorbed by 10 cc. of the oil per 15 minute interval at 200° C.

CONE TEST

This test is the means for determining the tendency of an oil to deposit solid matter upon heated metallic surfaces such as are present in the combustion chamber of spark-ignition type engines. It consists in slowly dropping the oil to be tested upon a heated metal (generally steel) cone having a circumferential groove milled out in screw fashion upon the periphery, the time of contact between the heated steel surface and the oil being about one minute. A total of 60 cc. of oil is dropped onto a cone from a dropping funnel during a period of 2 hours. The cone may be maintained at any desired temperature but, in testing automobile crankcase lubricating oils, a temperature of 250° C. is preferable. The cone is weighed before the test. After 60 cc. of oil have been passed over the cone, the latter is washed with naphtha to remove the adhering oil and the amount of solid deposits formed is determined by the weight differential.

The test does not appear to have any relation to the oxygen absorption test since lubricating oil blends of two separate compounds may give the same cone deposits but have widely different oxygen absorption rates, and vice versa. The test is, however, an important indication of the ability of an oil to resist deterioration at high temperatures. It has been found that the Cone test gives data which closely approximate the results obtained in the C. F. R. (Cooperative Fuel Research) test engine.

SLIGH TEST

This test is used as an indication of the tendency of a lubricating composition to form sludge under oxidizing conditions. The procedure of the test is described in Proc. A. S. T. M., v. 24, II, page 964 (1924); the only exception to this procedure was that the oxidation was conducted for 24 hours in testing the compounds of this invention.

LEAD TOLERANCE TEST

(Underwood test)

This test is used to determine the tendency of an oil to corrode bearings. In this test, 1500 cc. of the oil is maintained at 325° F. and sprayed for 5 hours upon four alloyed half-bearings, two being of copper-lead and two being cadmium silver. The oil dropping from the bearings is recirculated. The bearings are weighed before and after the test to determine any loss in weight. The test is then repeated with various additions of soluble lead compound, usually lead oleate, to the oil in increments of 0.005% by weight of lead. When the loss in weight of a half bearing amounts to 50 mg., the "lead tolerance" of the oil has been exceeded and the amount of lead added in the previous test is recorded as the "lead tolerance". A lead tolerance of above 0.02% is generally considered satisfactory.

The preparation of the compounds employed as addition agents in this invention, may be illustrated by the preparation of di-amylphenyl-thiocarboethoxy mono thio phosphite; 9.2 grams (0.4 mole) of sodium were added to 200 cc. of absolute ethyl alcohol and to the resulting solution were added 65.6 grams (0.4 mole) of tertiaryamylphenol dissolved in 100 cc. of absolute ethyl alcohol. The resulting sodium amylphenate was obtained in a dry state by distilling off the alcohol, the last traces of which were removed under vacuum. The sodium amylphenate was dissolved in 350 cc. of dry ethyl ether. As part of another phase of the preparation, 32 grams (0.2 mole) of potassium ethylxanthate were added to 27.5 grams (0.2 mole) of phosphorus trichloride dissolved in 100 cc. of dry carbon tetrachloride. The mixture was gently heated until all of the solid materials had dissolved. A gelatinous mass formed, and this was carefully added to the ether solution of sodium amylphenate. During this addition, heat was evolved. After refluxing the resultant mixture for 1 hour and washing it with water, the solution was washed with potassium xanthate solution to remove all traces of acid. After being washed further with water and dried, the product was obtained as a residue by distilling off the solvents. Analysis of the product established the sulfur content as being 5.51% and the following approximate formula:

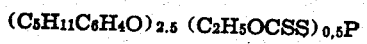

$$(C_5H_{11}C_6H_4O)_{2.5}(C_2H_5OCSS)_{0.5}P$$

Thus, the product was presumably a mixture of two or more compounds. The sulfur contained therein was sufficiently stable that the product was not corrosive to copper when a 0.5% solution of the compound in a hydrocarbon lubricating oil was heated to 210° F. for 3 hours in the presence of a copper strip.

Another example of the preparation of a compound suitable for use as an addition agent for lubricating oils, according to this invention, is the preparation of trithiocarboethoxytrithiol phosphate. 240 grams (1.5 mole) of potassium ethylxanthate were suspended in 1500 cc. of benzene. While the suspension was being agitated, a benzene solution of 80 grams (about 0.5 mole)

of freshly distilled phosphorus oxychloride was added through a dropping funnel. The resulting mixture was heated to insure completion of the reaction. Small quantities of potassium ethylxanthate were added to the reaction mixture until a sample of the latter gave a basic reaction of hydrolysis. The reaction products were isolated by adding ice to the reaction mixture and then washing the benzene layer free of base. Calcium chloride was employed to dry the benzene solution. The benzene was then distilled off and the residue heated under vacuum to remove traces of low-boiling impurities. The product, trithiocarboethoxy trithiol phosphate was a clear liquid, contained 7.39% of phosphorus and corresponded in composition to the formula $(C_2H_5OCSS)_3PO$ A further example according to the present invention is the preparation of trithiocarboethoxy trithio phosphite. 160 grams (1 mole) of potassium ethylxanthate were suspended in 500 cc. of benzene and 46 grams (⅓ mole) of phosphorus trichloride dissolved in benzene was added to the mixture from a dropping funnel while the mixture was agitated vigorously. Agitation was continued until all of the potassium ethylxanthate had reacted and then the benzene layer was water-washed. The benzene solution was then dried and the benzene was removed by distillation. The product trithiocarboethoxy trithio phosphite was a yellow liquid, contained 8.79% of phosphorus and corresponding in composition to the formula $(C_2H_5OCSS)_3P$.

Trithiocarboethoxy trithioarsenite, another compound suitable as an addition agent, according to the present invention, was prepared as follows:

A suspension of 240 grams (1.5 mole) of potassium ethylxanthate in 1200 cc. of benzene was rapidly stirred while 90.5 grams (0.5 mole) of arsenic trichloride was added from a dropping funnel over a period of 30 minutes. The benzene in the mixture was refluxed for 1.5 hours. A benzene solution of the product was washed with water to remove salts. After the mixture was dried over anhydrous sodium sulphate, the benzene was distilled from the dried mixture. The product, trithiocarboethoxy trithioarsenite, was a yellow solid. A yield of 95% was obtained. Analysis of the product established the presence of 18.2% of arsenic, whereas the theoretical value for the compound is 17.1%.

EXAMPLE 1

In order to demonstrate the advantages inherent in the use of the compounds of this invention as blending agents for lubricating oils, the oxidation rate and lead tolerance of a lubricating oil composition prepared by blending 0.25% of di-amylphenylthiocarboethoxy monothio phosphite, the preparation of which was previously described, in an S. A. E. 20 oil were determined. The following results were obtained:

| | Oxidation rate | Lead tolerance |
|---|---|---|
| Unblended S. A. E. 20 mineral oil | 74, 40, 35, 38 | 0.010 |
| Blended S. A. E. 20 mineral oil composition | 24, 26, 22, 18 | 0.035 |

These data show that di-amylphenylthiocarboethoxy monothio phosphite was effective in reducing the oxidation rate of the oil and also it improved the corrosion resistance of the oil.

A lubricating oil blend of di-amylphenylthiocarboethoxy monothio phosphite was tested by the Cone test; the following data were obtained:

Cone test—Gain in weight of cone, g.
Unblended S. A. E. 40 mineral oil _____ 0.50
Blended S. A. E. 40 mineral oil composition __ 0.39

These data indicate that di-amylphenylthiocarboethoxy monothio phosphite reduced residue formation from the oil under conditions similar to those existing during automobile engine operation.

EXAMPLE 2

The following oxidation rate data were obtained on an 0.25% blend of trithiocarboethoxy trithio phosphite $(C_2H_5OCSS)_3P$ in an S. A. E. 20 mineral oil:

Oxidation rate
Unblended S. A. E. 20 mineral oil ___ 20, 38, 37, 31
Blended S. A. E. 20 mineral oil composition _____ 3, 4, 5, 9

EXAMPLE 3

The effect of the thiocarboxy group is shown by the following comparative Cone test data on 0.25% blends of paratolyl phosphite and di-amylphenylthiocarboethoxy monothio phosphite in an S. A. E. 40 oil:

Cone test—Gain in weight of cone, g.
S. A. E. 40 oil _____ .50
+0.25% p-tolyl phosphite _____ .43
+0.25% di-amylphenylthiocarboethoxy monothio phosphite _____ .39

The following results were obtained in the Sligh test on blends of these compounds in an S. A. E. 20 oil:

Sligh test
S. A. E. 20 mineral oil + 0.25% para-tolyl phosphite _____ 32.5
S. A. E. 20 mineral oil + 0.25% di-amylphenylthiocarboethoxy monothio phosphite _____ 19.7

These data demonstrate that the thiocarboethoxy phosphite compound has a greater effect in reducing the formation of hard deposits from an oil upon heated metallic surfaces of spark-ignition type engines and also inhibits the formation of sludge in an oil to a greated extent than do the simple organic phosphites.

The present invention is not limited to the specific compounds previously mentioned since these embodiments of the invention are presented merely to illustrate and convey an appreciation of the invention. It is possible to formulate other embodiments of the invention and employ compounds other than those specifically mentioned as additives in lubricating oils without departing from the scope of the invention described herein. It is therefore desired to claim all the novelty inherent in the disclosure which has been made.

What is claimed is:

1. An improved lubricating composition which comprises a mineral oil lubricant and between 0.05% and 2% of a compound of formula

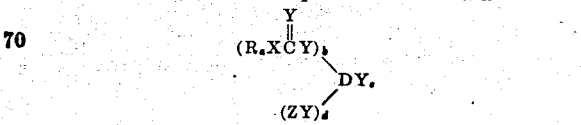

in which R is a radical of the class consisting of hydrogen and organic radicals. X is an element of the class consisting of oxygen, sulfur and nitrogen, Y is an element of the class consisting of oxygen and sulfur, D is an element of the class consisting of phosphorus, arsenic, antimony and bismuth, Z is a grouping selected from the class if metals, monovalent organic radicals and onium bases; and the subscripts, $a$, $b$, $c$ and $d$ have numerical values in accordance with valency requirements.

2. An improved lubricating composition which comprises a mineral oil lubricant and between 0.05% and 2% of a phospho-xanthogen compound of formula

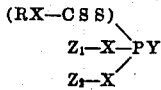

in which R is an organic radical, X is an element selected from the class of oxygen and sulfur, Y when phosphorus is pentavalent is an element selected from the class of oxygen and sulfur and $Z_1$ and $Z_2$ are groups selected from the class of xanthogen groups and organic radicals.

3. An improved lubricating composition which comprises a mineral oil lubricant and between 0.05% and 2% of phospho-xanthogen compound of formula

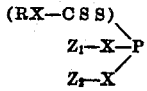

in which R is an organic radical, X is an element selected from the class of oxygen and sulfur and $Z_1$ and $Z_2$ are groupings selected from the class of xanthogen groups and organic radicals.

4. An improved lubricating composition which comprises a mineral oil lubricant and between 0.05% and 2% of a phospho-xanthogen compound of formula

in which R is an alkyl group, X is an element selected from the class of oxygen and sulfur and $Z_1$ and $Z_2$ are alkylated aromatic groupings.

5. An improved lubricating composition which comprises a mineral oil lubricant in between 0.05% and 2% of diamylphenylthiocarboethoxy monothio phosphite.

6. An improved lubricating composition which comprises a mineral oil lubricant and between 0.05% and 2% of a phospho-xanthogen compound of formula $$(RXCSS)_3P$$

in which R is a grouping selected from the class of alkyl and alkylated phenyl groups and X is an element selected from the class of oxygen and sulfur.

7. An improved lubricating composition which comprises a mineral oil lubricant and between 0.05% and 2% of phospho-xanthogen compound of formula $$(RXCSS)_3P$$

in which R is an alkyl group and X is an element selected from the class of oxygen and sulfur.

8. An improved lubricating composition containing a mineral oil lubricant and a small quantity of trithiocarboethoxy trithio phosphite.

9. An improved lubricating composition which comprises a mineral oil lubricant and a small quantity of trithiocarboethoxy trithioarsenite.

JOSEPH F. NELSON.